United States Patent [19]

Yang

[11] Patent Number: 5,727,587

[45] Date of Patent: Mar. 17, 1998

[54] MIXER CONTROL VALVE

[76] Inventor: Tsai-Chen Yang, 58, Ma Yuan West St., Taichung, Taiwan

[21] Appl. No.: 718,800

[22] Filed: Sep. 24, 1996

[51] Int. Cl.$^6$ .................................................. G05D 11/00
[52] U.S. Cl. ................................... 137/100; 137/87.04
[58] Field of Search ........................... 137/98, 100, 113, 137/87.03, 87.04

[56] References Cited

U.S. PATENT DOCUMENTS

| 1,508,938 | 9/1924  | Powers  | 137/100 |
| 1,989,248 | 1/1935  | Scott   | 137/100 |
| 2,987,070 | 6/1961  | Fraser  | 137/100 |
| 3,099,996 | 8/1963  | Symmons | 137/100 |
| 3,605,784 | 9/1971  | Bowman  | 137/100 |
| 3,921,659 | 11/1975 | Rudewick | 137/98 |
| 5,299,593 | 4/1994  | Ottelli | 137/100 |
| 5,425,394 | 6/1995  | Clare   | 137/100 |

Primary Examiner—Denise L. Ferensic
Assistant Examiner—Ramyar Farid

[57] ABSTRACT

A mixer control valve comprises a base, a cover covering the base, and a washer, a cylinder and a control shaft disposed between the base and the cover. The mixer control valve couples with a water volume control valve. The water volume control valve has a control rod and a plurality of positioning rods. The cover has a first outlet, a second outlet, a plurality of fasteners, and a plurality of positioning holes to receive the corresponding positioning rods.

2 Claims, 6 Drawing Sheets

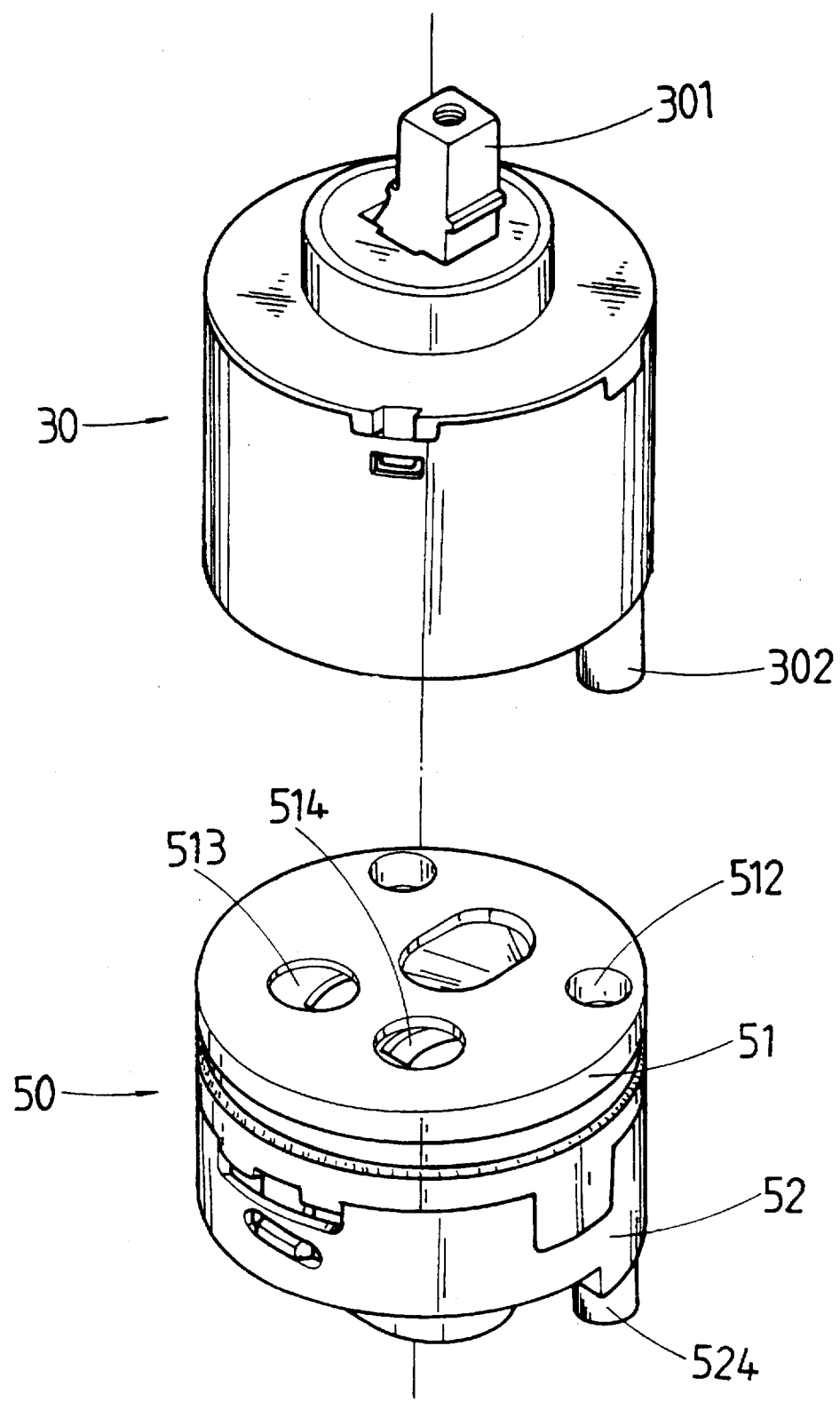
F I G. 2

5,727,587

MIXER CONTROL VALVE

BACKGROUND OF THE INVENTION

The invention relates to a mixer control valve. More particularly, the invention relates to a mixer control valve of a faucet.

The conventional mixer control valve cannot stop the flow of the cool water immediately while the flow of the hot water is stopped.

SUMMARY OF THE INVENTION

An object of the invention is to provide a mixer control valve which can stop the flow of the cool water and the flow of the hot water almost simultaneously.

Accordingly, a mixer control valve comprises a base, a cover covering the base, and a washer, a cylinder and a control shaft disposed between the base and the cover. The mixer control valve couples with a water volume control valve. The water volume control valve has a control rod and a plurality of positioning rods. The cover has a first outlet, a second outlet, a plurality of fasteners, and a plurality of positioning holes to receive the corresponding positioning rods. The control shaft has a main body, a first hollow cone receiving a left distal portion of the main body, a second hollow cone receiving a right distal portion of the main body, a first retaining ring enclosing a left end of the main body, and a second retaining ring enclosing a right end of the main body. The base has a first inlet, a second inlet, a plurality of posts, and a plurality of slots to receive the corresponding fasteners. The control shaft is inserted in the cylinder. The cylinder has a middle portion, a left flange, a right flange, a first spacing formed between the middle portion and the left flange, and a second spacing formed between the middle portion and the right flange. The washer surrounds the middle portion of the cylinder.

BRIEF DESCRIPTION OF THE DRAWINGS

FIG. 2 is a perspective exploded view of a mixer control valve and a water volume control valve;

DETAILED DESCRIPTION OF THE INVENTION

Figure 1:
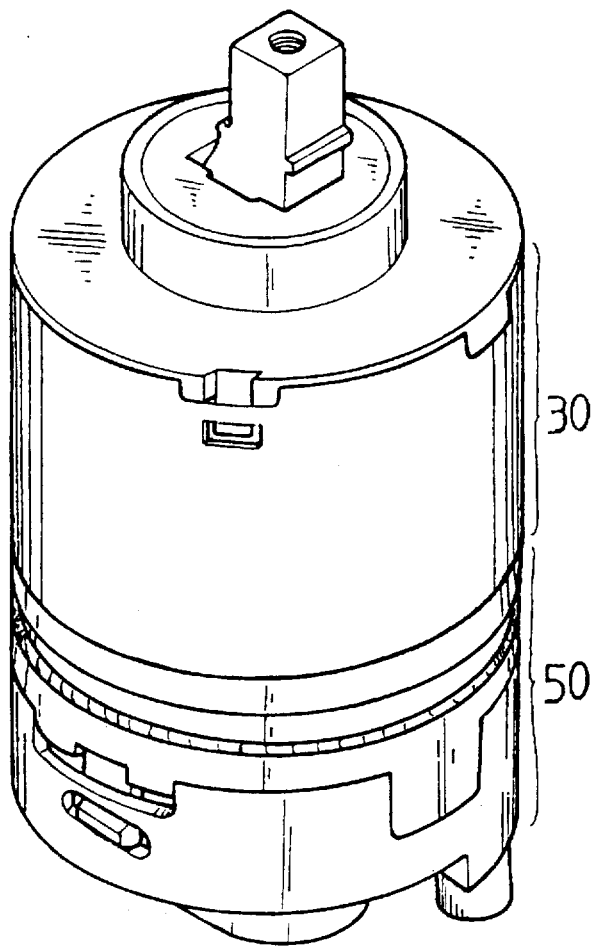
FIG. 1 is a perspective assembly view of a mixer control valve and a water volume control valve.
Figure 3:
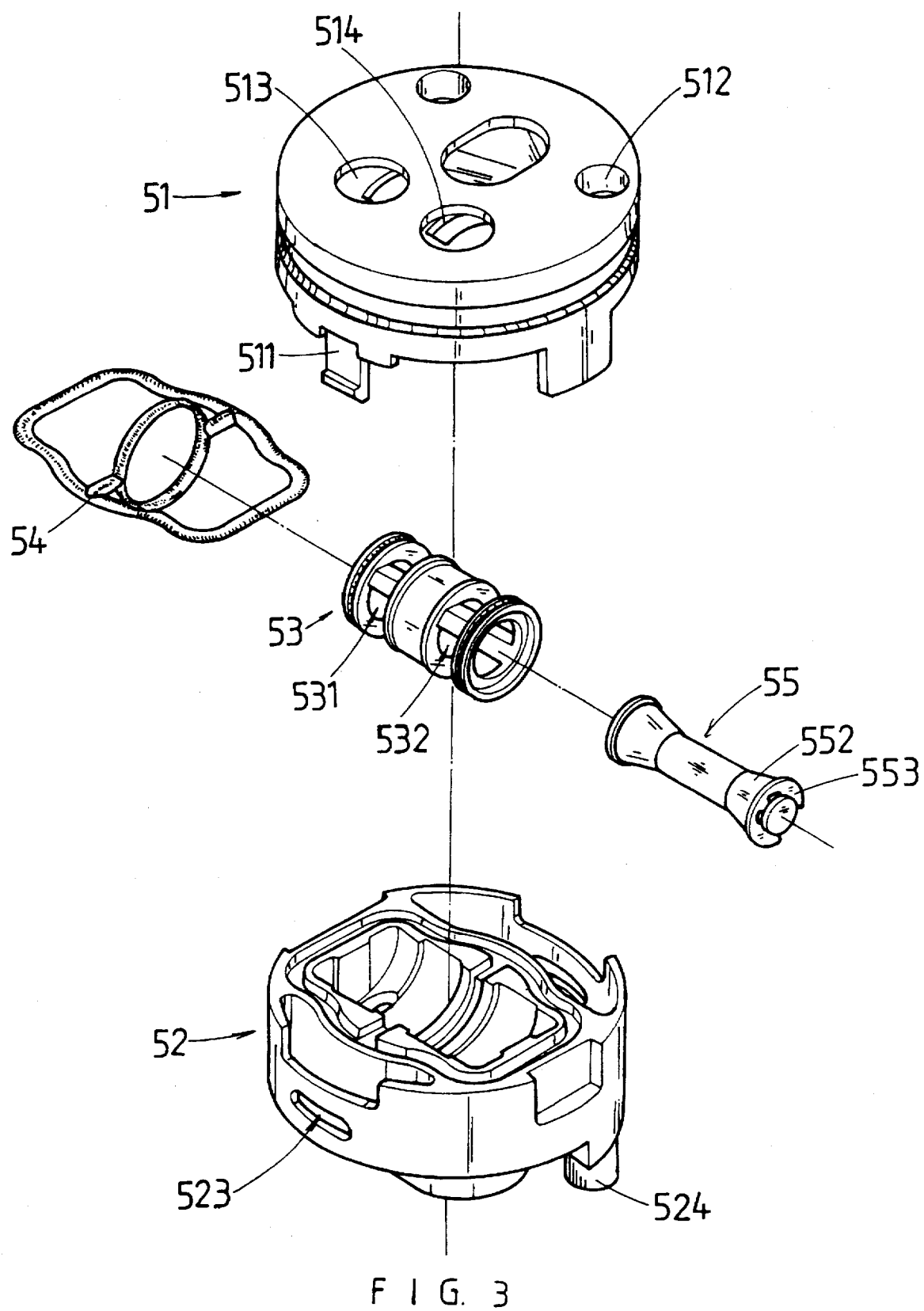
FIG. 3 is a perspective exploded view of a mixer control valve.
Figure 4:
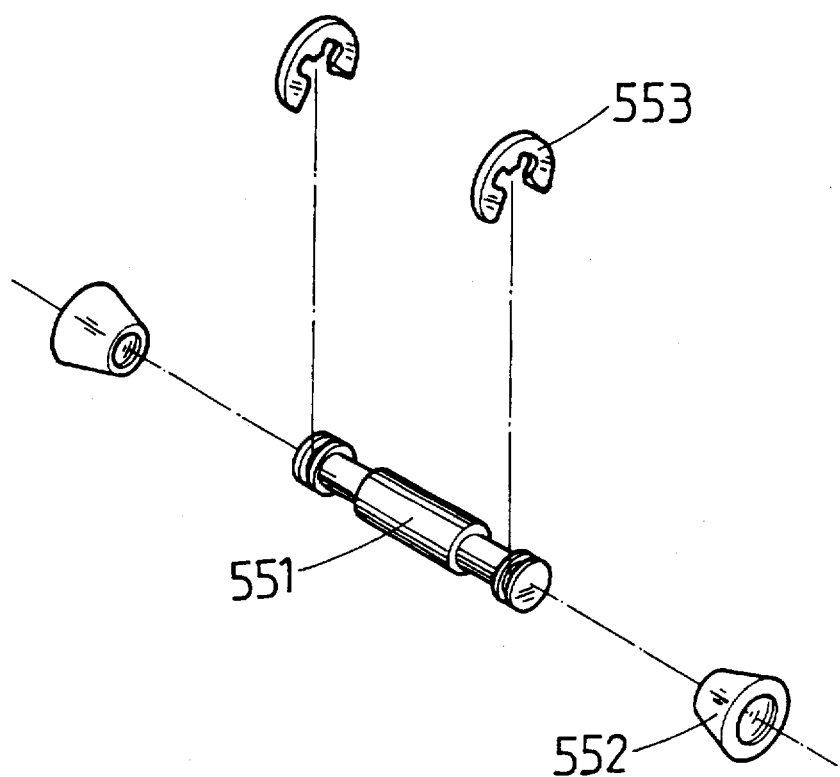
FIG. 4 is a perspective exploded view of a control shaft.
Figure 5:
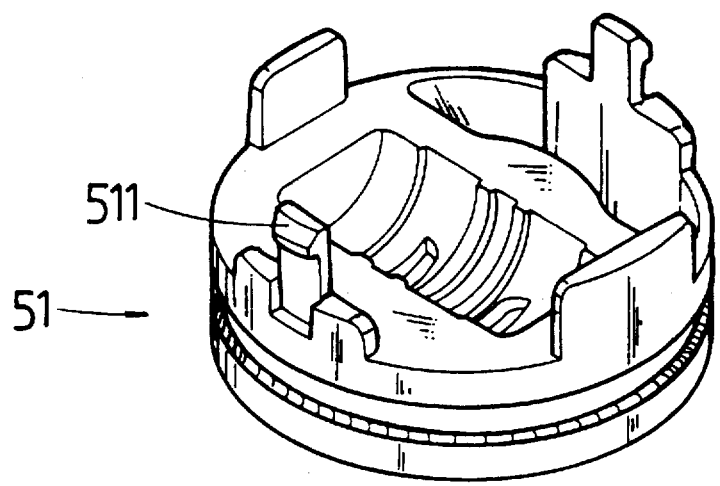
FIG. 5 is a perspective view of a cover.
Figure 6:
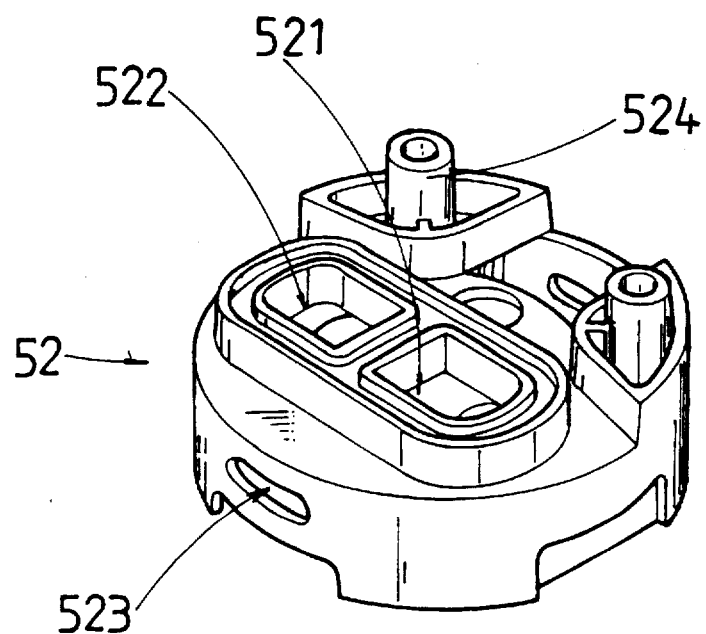
FIG. 6 is a perspective view of a base.

Referring to FIGS. 1 to 6, a mixer control valve 50 comprises a base 52, a cover 51 covering the base 52, and a washer 54, a cylinder 53 and a control shaft 55 disposed between the base 52 and the cover 51. The mixer control valve 50 couples with a water volume control valve 30. The water volume control valve 30 has a control rod 301 and a plurality of positioning rods 302. The cover 51 has a first outlet 513, a second outlet 514, a plurality of fasteners 511, and a plurality of positioning holes 512 to receive the corresponding positioning rods 302.

The control shaft 55 has a main body 551, a first hollow cone 552 receiving a left distal portion of the main body 551, a second hollow cone 552 receiving a right distal portion of the main body 551, a first retaining ring 553 enclosing a left end of the main body 551, and a second retaining ring 553 enclosing a right end of the main body 551.

The base 52 has a first inlet 521, a second inlet 522, a plurality of posts 524, and a plurality of slots 523 to receive the corresponding fasteners 511. The control shaft 55 is inserted in the cylinder 53. The cylinder 53 has a middle portion, a left flange, a right flange, a first spacing 531 formed between the middle portion and the left flange, and a second spacing 532 formed between the middle portion and the right flange. The washer 54 surrounds the middle portion of the cylinder 53.

Figure 7:
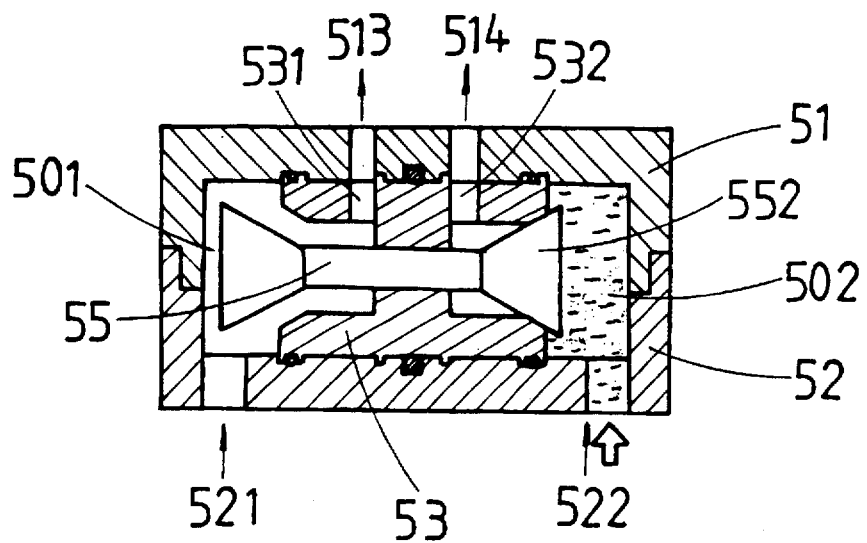
FIGS. 7 and 8 are sectional views of a mixer control valve.
Figure 8:
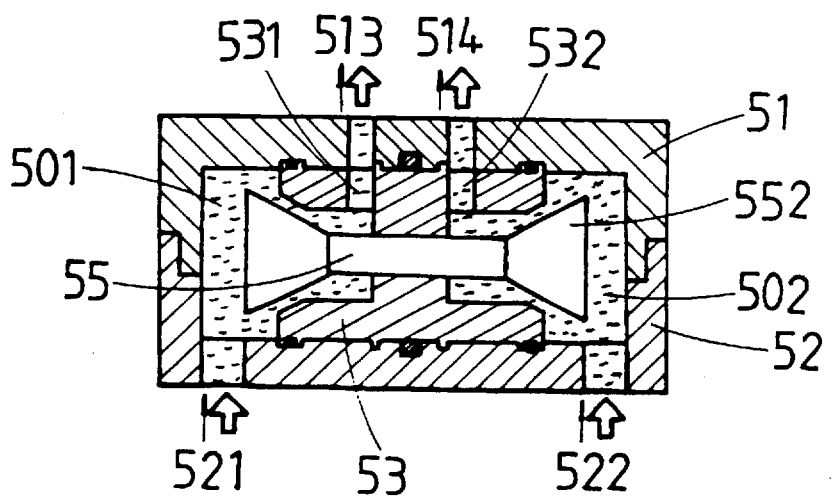

Referring to FIGS. 7 and 8, the hot water enters the mixer control valve 50 via the first inlet 521 and the cool water enters the mixer control valve 50 via the second inlet 522. The control shaft 55 is disposed in a center interior of the cylinder 53. The base 52, the cover 51 and the cylinder 53 defines a first chamber 501 communicating with the first inlet 521 and a second chamber 502 communicating with the second inlet 522. The hot water enters the first chamber 501. The cool water enters the second chamber 502. If the hot water does not enter the first chamber 501 continuously, the control shaft 55 will move toward a left end of the cylinder 53. Thus the second hollow cone 552 blocks the second outlet 514.

The invention is not limited to the above embodiment but various modification thereof may be made. Further, various changes in form and detail may be made without departing from the scope of the invention.

I claim:

1. A mixer control valve comprising:

a cover having a first outlet, a second outlet, and a plurality of positioning holes, a control shaft having a main body, a first hollow cone receiving a left distal portion of said main body, a second hollow cone receiving a right distal portion of said main body, a first retaining ring enclosing a left end of said main body, and a second retaining ring enclosing a right end of said main body, a base having a first inlet, a second inlet, a plurality of posts, and a plurality of slots, a cylinder having a middle portion, a left flange, a right flange, a first spacing formed between said middle portion and said left flange, and a second spacing formed between said middle portion and said right flange, a washer surrounding said middle portion of said cylinder, said control shaft inserted in said cylinder, said cover covering said base, said washer and said cylinder disposed between said base and said cover, wherein a hot water enters said mixer control valve via said first inlet and a cool water enters said mixer control valve via said second inlet, said control shaft is disposed in a center interior of said cylinder, wherein said base, said cover and said cylinder defines a first chamber communicating with said first inlet and a second chamber communicating with said second inlet so that said hot water enters said first chamber and said cool water enters said second chamber, said control shaft includes means such that as soon as said first chamber has a greater pressure than said second chamber the control shaft will move toward a right end of said cylinder so that said first hollow cone blocks said first outlet and as soon as said second chamber has a greater pressure than said first chamber the control shaft will move toward a left end of said cylinder so that said second hollow cone blocks said second outlet.

2. A mixer control valve as claimed in claim 1, wherein a plurality of fasteners are disposed beneath said cover to be inserted in said corresponding slots.

* * * * *